US006842726B1

(12) United States Patent
Scharosch et al.

(10) Patent No.: US 6,842,726 B1
(45) Date of Patent: Jan. 11, 2005

(54) METHOD OF DETERMINING RF COVERAGE AREA IN A POINT-TO-MULTIPOINT TRANSMISSION SYSTEM

(75) Inventors: Gregory Scharosch, Everett, WA (US); Kurt Swanson, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 548 days.

(21) Appl. No.: 09/874,570

(22) Filed: Jun. 5, 2001

(51) Int. Cl.[7] .......................... H04Q 7/20; G06F 17/50; G06G 7/62

(52) U.S. Cl. ............................... 703/13; 703/1; 703/5; 455/446

(58) Field of Search ................... 703/5, 1, 13; 455/446

(56) References Cited

U.S. PATENT DOCUMENTS

| | | | | |
|---|---|---|---|---|
| 5,561,841 A | * | 10/1996 | Markus | 455/33.1 |
| 5,710,758 A | * | 1/1998 | Soliman et al. | 370/241 |
| 5,963,857 A | * | 10/1999 | Reynolds et al. | 455/457 |
| 5,966,661 A | * | 10/1999 | Bernardin et al. | 455/446 |
| 5,983,106 A | * | 11/1999 | Bernardin et al. | 455/446 |
| 6,006,095 A | * | 12/1999 | Bernardin et al. | 455/446 |
| 6,041,236 A | * | 3/2000 | Bernardin et al. | 455/446 |
| 6,052,583 A | * | 4/2000 | Bernardin | 455/423 |
| 6,173,185 B1 | * | 1/2001 | Bernardin et al. | 455/446 |
| 6,173,186 B1 | * | 1/2001 | Dalley | 455/446 |

OTHER PUBLICATIONS

Koilpillai, R. D. "Radiowave Propagation in Multipath Channels: Large Scale Effects." Wiley Encyclopedia of Electrical and Electronics Engineering, 1999.*

U.S. Trademark Ser. No. 75450561. "deciBel Planner". Filed Mar. 16, 1998. Published for Opposition Jan. 25, 2000. http://tess.uspto.gov.*
"DeciBel Planner: Wireless network design software". Copyright 2000. http://www.mapinfo.com/community/free/library/dbplanner.pdf.*
"MapInfo and Wireless Communications: Enhance Network Engineering Using Mapping Technology". Copyright 1998. http://www.mapinfo.com/community/free/library/wireless_engineering_ds.pdf.*
"Telebec Mobilite: Accurately Modeling and Predicting Coverage for Optimal and Cost–effective Network Expansion" Copyright 2000. http://www.mapinfo.com/community/free/library/telebec_casestudy.pdf.*
"Athena: RF Propagation Tool" Copyright 2001. http://www.waveconceptsintl.com/athena.*

(List continued on next page.)

Primary Examiner—Jean R. Homere
Assistant Examiner—Ayal Sharon
(74) Attorney, Agent, or Firm—McIntyre Harbin & King

(57) ABSTRACT

A method of determining RF coverage area in a point-to-multi-point RF transmission system and creating model maps showing serviceable business addresses within a given region. The method includes selecting a standard design signal strength level required to provide suitable service; obtaining field measurements of received signal strength from base stations at various points in the region under investigation; creating a model map of received signal strength having a signal strength level greater than the system standard signal strength level and excluding areas whose field strength measurements do not indicate suitable service; and creating a model map having a signal strength level smaller than the system standard signal strength level. The method is capable of providing more than 90% accuracy, and prevents needless dispatching of installation crews to a customer premise that is outside the effective RF coverage of the system.

14 Claims, 10 Drawing Sheets

OTHER PUBLICATIONS

Press releases about Athena, dating back to Jan. 1998. http://www.waveconceptsintl.com/main.html.*

"Geographic Information Systems", Wiley Encyclopedia of Electrical and Electronics Engineering, vol. 8, pp. 320–325. Copyritght 1999.*

"Radio Telemetry", Wiley Encyclopedia of Electrical and Electronics Engineering, vol. 18.pp. 168–169. Copyritght 1999.*

"News Release: RCC Consultants, Inc. Announces Latest Applications Software Releases for Comsite Products". Apr. 24, 2001. http://www.rcc.com/resources/pdf/comsite_announcement.pdf.*

"Wireless Network Engineering and Planning With Romulus 6.3" http://www.rcc.com/resources/pdf/romulus.pdf.*

E–mail from Shirelle Green, forwarding declaration from RCC Consultants that "Wireless Network Engineering and Planning With Romulus 6.3" was published on Jan. 5, 2001.*

* cited by examiner

US 6,842,726 B1

METHOD OF DETERMINING RF COVERAGE AREA IN A POINT-TO-MULTIPOINT TRANSMISSION SYSTEM

BACKGROUND

The present invention relates to wireless communication, but more specifically to a method of determining RF coverage area in a point-to-multipoint RF transmission system.

In traditional wire-line telephone networks, subscriber telephones are connected to a central office (CO) switching facility via central office trunks (i.e., local telephone lines). Multiple switching facilities located throughout a given region communicate with each other and, in turn, interconnect subscribers through various communities. Fixed wireless systems, on the other hand, use radio frequency (RF) links that replace traditional wire line interconnections between switching facilities and subscriber telephones. As shown in FIG. 1, a typical fixed wireless system includes at least one mobile switching center (MSC) 110 that provides a gateway to a wire-line public switched telephone network (PSTN) 120. The system also includes remote stations 130 that are used by mobile subscribers 140, 141 or wired subscribers 150, and at least one base station 160 that is linked with the switching center and several remote stations. Each remote station may communicate with the base stations on different frequencies. Unlike traditional wireless communication systems, the remote stations in a fixed wireless system may be configured to communicate with only one specific base station.

Determination or prediction of RF coverage area provided by a base station plays an important role in the installation and servicing of fixed, remote stations at customer premise locations. RF coverage generally refers to the geographic area in which a remote station 130 may effectively communicate with a base station 160 without significant signal interruption or degradation. Prior to installing a remote terminal or station at a customer premise location, it is initially determined whether base station RF signals received at a customer's location meet required signal strengths for suitable service. High accuracy in coverage area prediction obviates needless dispatching of installation and maintenance crews to a customer premise location that lies outside an effective RF coverage area of a base station, and therefore assures successful and cost-efficient operations.

Mathematical models, such as the Cost 231/HATA method, are conventionally used to predict whether a site located at a particular address is serviceable by a fixed wireless system. Mathematical models, however, vary in degree of sophistication and accuracy, and many of them previously used have several drawbacks. A first drawback is the susceptibility of inaccuracy due to changes in environmental conditions. Another concerns the expense of replicating, if at all possible, the morphology, land usage types, physical structures and terrain combinations found in regions to be studied. Accordingly, mathematical models used in the past are only capable of predicting accurately up to about 70%.

Therefore, an object of the present invention is to provide a method of accurately predicting RF coverage area in point-to-multipoint wireless systems so as to enable strategic decision-making and/or planning relative to providing, installing, or maintaining a point-to-multipoint wireless transmission system.

SUMMARY OF THE INVENTION

In accordance with one aspect of the invention, there is provided a method of determining RF coverage area in a point-to-multipoint RF transmission system. The method enables creation of a map depicting serviceable addresses and includes determining a standard signal strength design level and collecting detailed field measurements of received signal strength of signals from each base station in the service region using a portable test unit. Detailed field measurements include geographic coordinates and field strength indications at a number of measurement points in an area of investigation.

In a preferred embodiment, the method further includes creating a first model map depicting regions having a signal strength level greater than the design signal strength level and excluding areas in the model map where field strength measurements indicate non-serviceable areas. Then, a second model map is created that depicts regions having a signal strength level less than the design signal strength level. Third, the method includes combining the first model map and the second model map to generate a composite map depicting serviceable and non-serviceable areas.

In accordance with another embodiment of the invention, the first model map is created by the following steps. First, a third model map is created that depicts regions having a signal strength level greater than the standard signal strength level. Second, a fourth map is created including measurement points at which the field strength measurements indicate non-serviceable areas. Third, a non-serviceable geographical shape encompassing the field measurements is created in this fourth map by drawing a perimeter around these measurement points. Fourth, the non-serviceable geographical shape is subtracted from the third model map.

In yet another embodiment of the invention, the second model map is created by creating a fifth model map that depicts signal strength levels less than the design signal strength level; creating a sixth model map including field measurement points that indicate suitable service; creating a serviceable geographic region having a shape encompassing the field measurements in the sixth model map by, for example, drawing a perimeter around the field measurement points; and finally, overlaying the serviceable geographic shape on top of the fifth model map.

Other features, aspects and advantages of the invention will become apparent upon review of the following description taken in connection with the accompanying drawings. The invention, though, is pointed out with particularity by the appended claims.

DESCRIPTION OF ILLUSTRATIVE EMBODIMENTS

Figure 1:
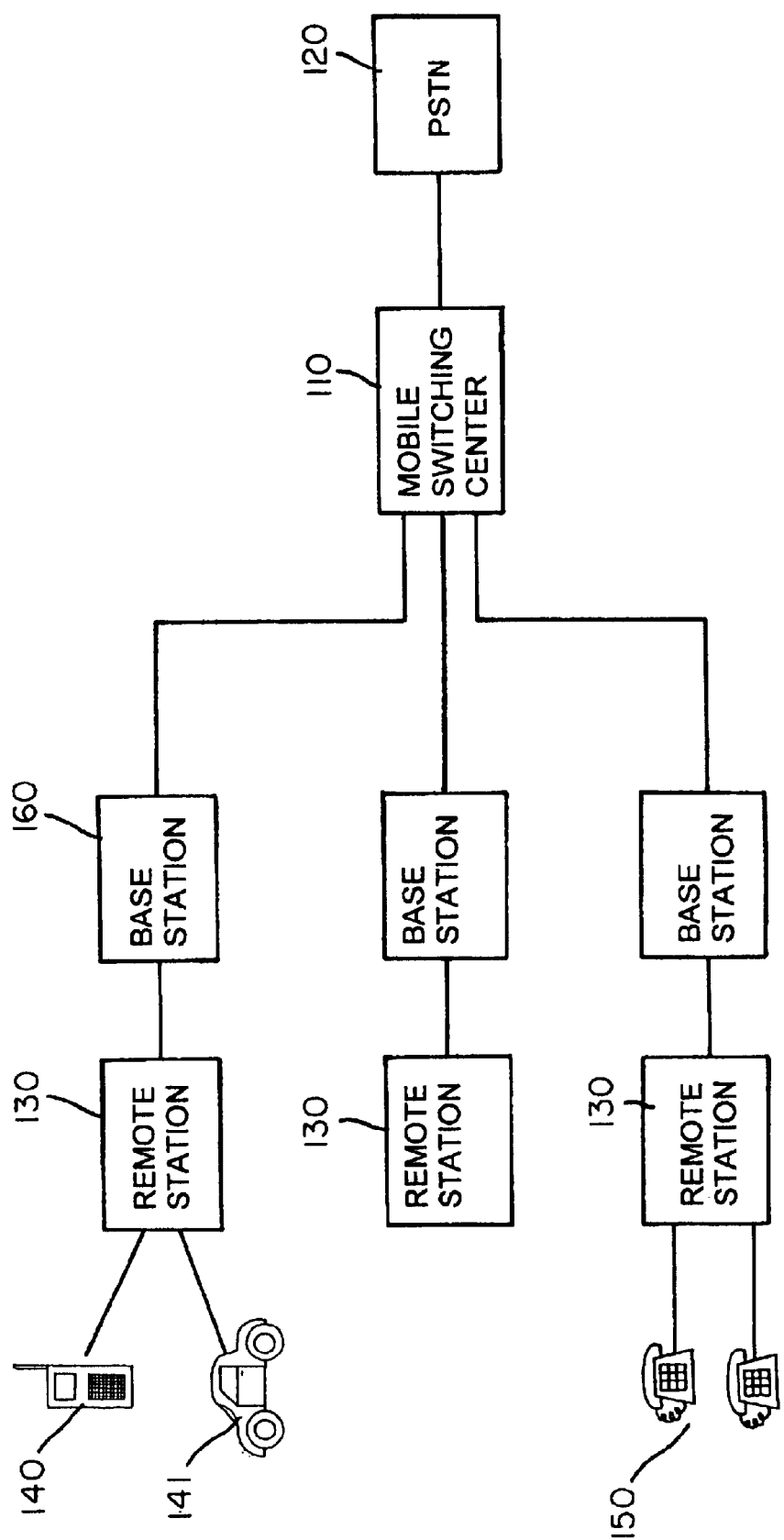
FIG. 1 shows a block diagram of a typical point-to-multipoint fixed wireless system as known in the prior art.
Figure 2:
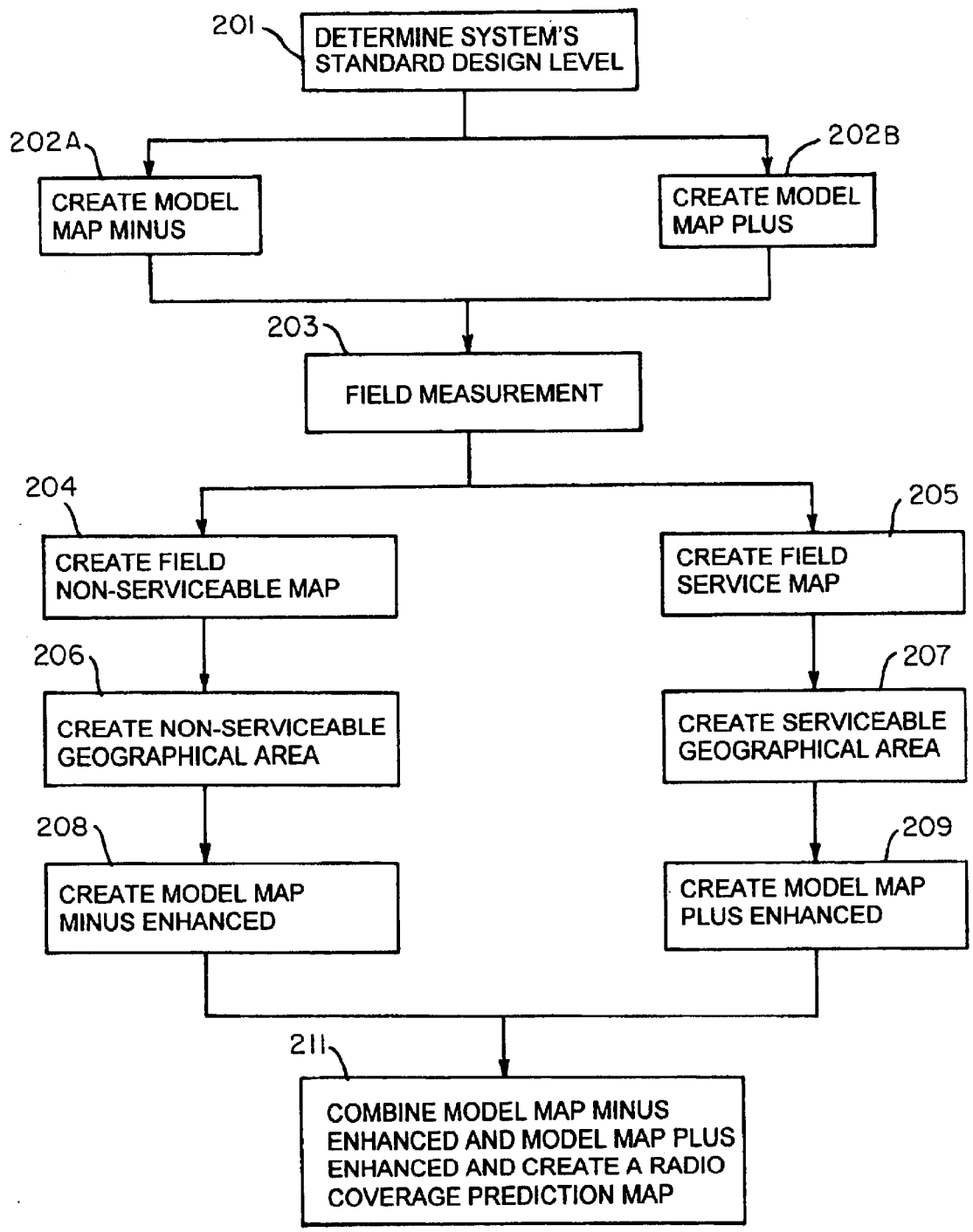
FIG. 2 is a flow chart illustrating a method for predicting RF coverage according to an embodiment of the present invention.

FIG. 2 is a flow chart illustrating a method of predicting RF coverage according to one aspect of the present invention. As illustrated, a signal strength design level of the fixed wireless system, i.e., a predetermined signal strength level required to provide adequate service, is determined at step 201. A typical signal strength design level for a 56 kHz channel may, for example, be −102 dBm. Although particularly useful for determining coverage area in point-to-multipoint RF transmission systems, the invention may also be useful in point-to-point transmission systems and RF broadcast systems generally.

Figure 3:
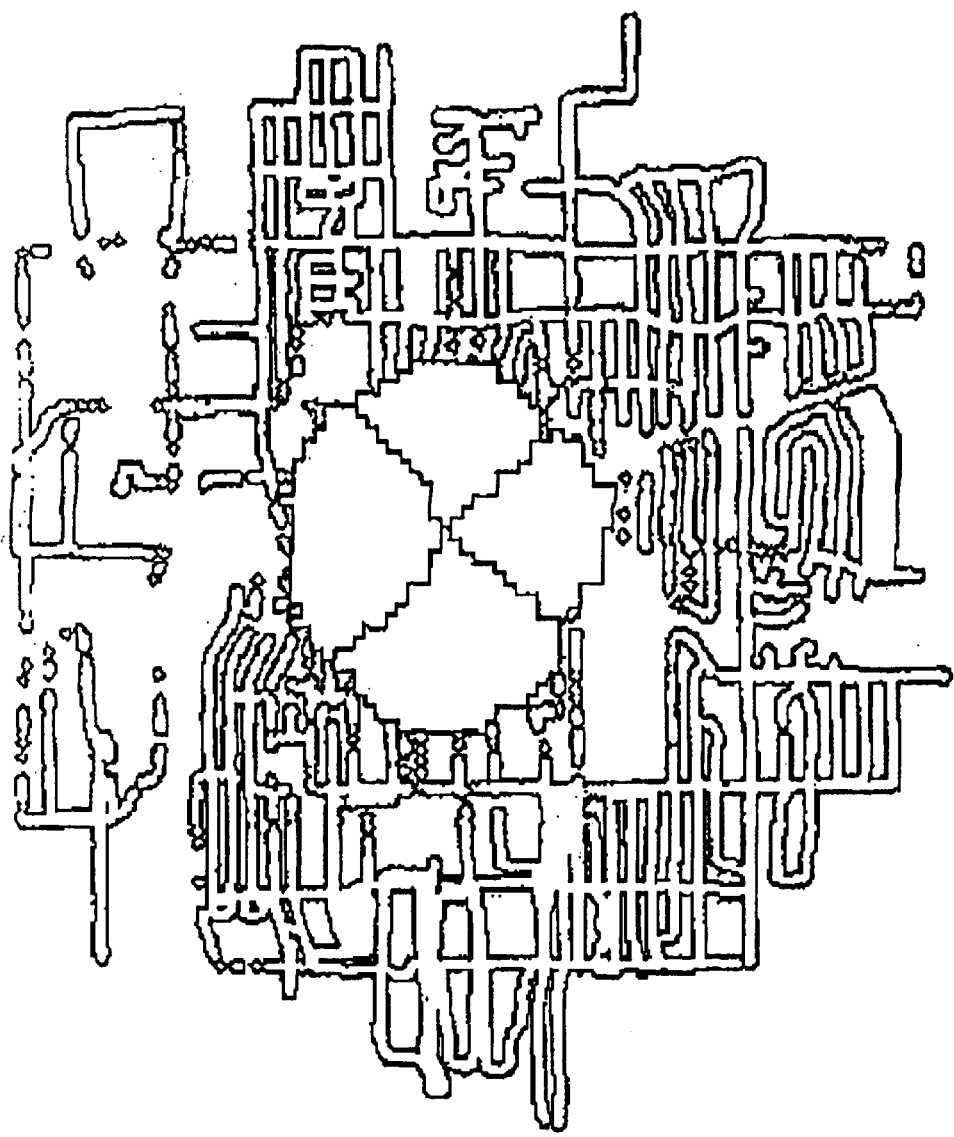
FIG. 3 shows an exemplary "model map minus" that is generated according to an embodiment of the present invention.

A serviceable building address coverage area, which resides in an area or region called a "model map minus," is created using a traditional mathematical model that includes an additional link budget reduction margin (step 202). FIG. 3 shows an exemplary "model map minus" in a region of a metropolitan area. During the determination of service availability, a link budget margin reducing the serviceable geographic area must be kept in mind. This is because a large margin results in a significant increase in infrastructure cost. The additional link budget reduction margin is typically 10 dBm. When a fixed wireless system's standard design level is −102 dBm, a Received Signal Strength Indicator (hereinafter "RSSI") level for the "model map minus" is −92 dBm. A −92 dBm "model map minus" is significantly smaller than a serviceable map without the additional link budget reduction margin, allows less loss, and has a 98% overall accuracy rate, but requires at least four times the number of base stations to cover the same geographic coverage area.

Figure 4:
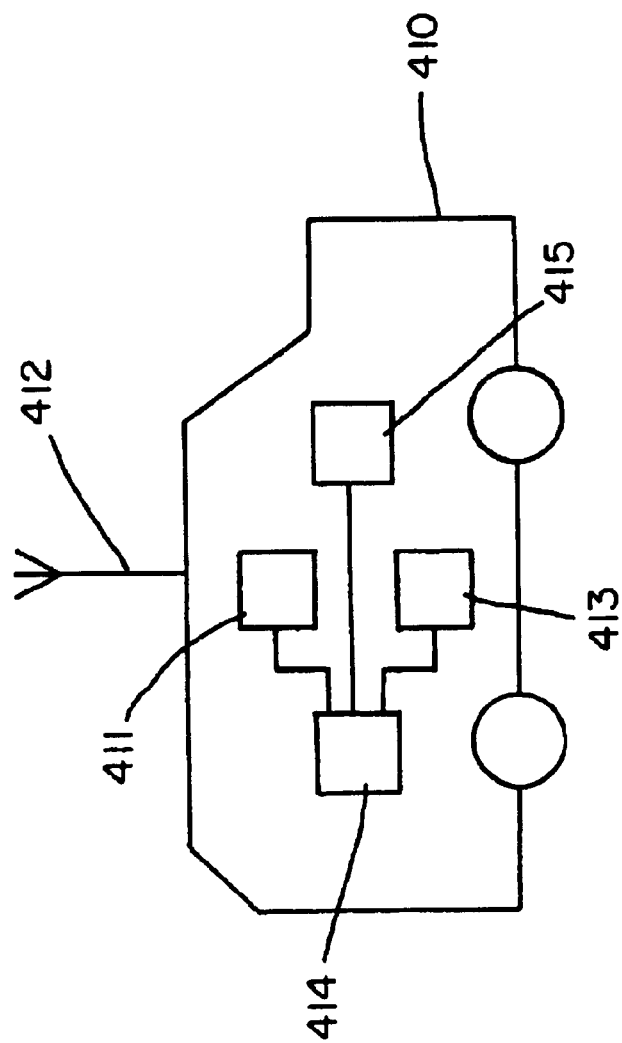
FIG. 4 illustrates a test vehicle that is used in one embodiment of the present invention.

Detailed field measurements of the received signal strength from each base station of the fixed wireless system are collected at step 203. Using a mobile test unit, such as a test vehicle 410 (shown in FIG. 4), field engineers or technicians map out or navigate the area potentially covered by the fixed wireless system, collecting received signal strengths at a variety of measurement points throughout the area. Accessible streets are driven, and measurements are taken, for example, every 20 meters. The test vehicle 410 illustrated in FIG. 4 includes a test receiver 411 placed inside a vehicle. The test receiver 411 could, for example, be an HP-74xx series test receiver that is known in the art. Antenna 412 of the test receiver 411 is roof-mounted on test vehicle 410 and a locating device 413 is connected with the test receiver 411 to generate geographic coordinates (e.g., latitude and longitude), which are recorded or stored in a storage device 415, along with associated signal strength measurements. The locating device 413 may, for example, utilize a Global Positioning System (GPS) to generate the geographic coordinates. Test vehicle 410 includes a computer 414 for real-time data processing. Alternatively, the collected signal strength data and coordinates may be downloaded for subsequent processing.

The previously described method of field measurement measures signals from base stations to the mobile test unit. Other techniques, however, may be employed for field strength measurement. For example, techniques may be used where the mobile test unit transmits test signals at different frequencies whose strengths are measured at base stations 160. Thus, the invention is not limited to taking signal strength measurement at the remote locations.

Returning to FIG. 2, step 204 includes processing the field measurement data obtained by step 203, and creating a "field non-serviceable map," using measurement points that do not indicate suitable service. As is known, coverage area in a given geographical region is defined to be locations where the signal strength exceeds the wireless system's standard design level. When the field strength at a given area significantly drops below the standard design level, a so-called "hole" occurs in the coverage area, which may result in a breakdown in the communication link. The "field non-service map" identifies these holes, which subsequently increases the accuracy of the prediction.

Step 205 includes pre-processing the field measurement data obtained during the performance of step 203, and creating a "field service map" using measurement points that indicate suitable service. The "field service map" includes a margin that takes into account the difference between field measurements developed during the street and field measurements collected at the roof of a building address, as well as the chimney and sidewalls of a building. Measurements may be collected in a variety of ways. For example, a portable device relaying measurements to test vehicle 410 may be used to collect the measurements inaccessible to the test vehicle or the test vehicle 410 may be modified to access the areas and collect the measurements. The margin may, for example, be −8 dBm. When the fixed wireless system's standard design level is −102 dBm, the RSSI level for "field service map" is −110 dBm.

Figure 5:
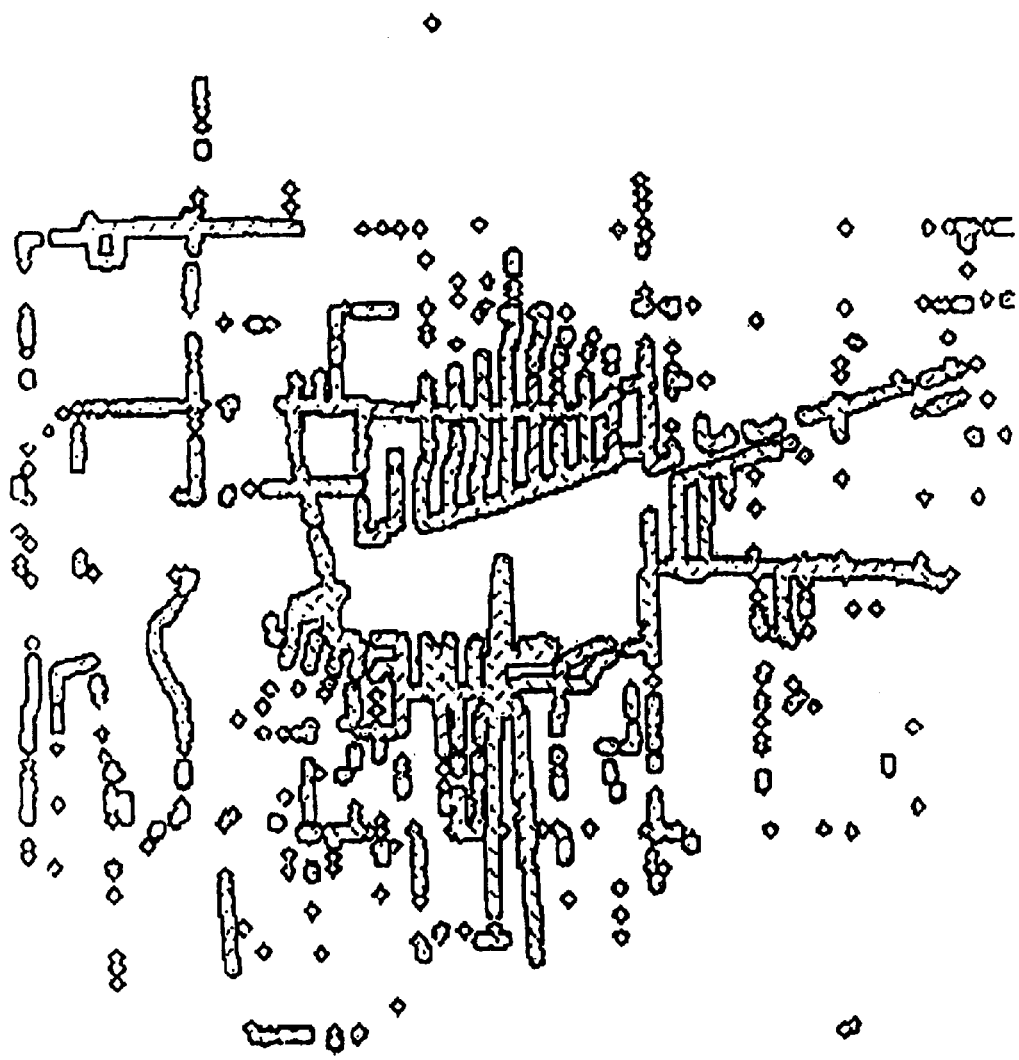
FIG. 5 shows an exemplary map indicating the non-serviceable geographical area based on field measurements according to an aspect of the present invention.

Step 206 uses a "field non-service map" to create a single geographical object encompassing all of the non-serviceable data points. Either a circle is drawn around each measurement point or a rectangle is drawn around a series of consecutive measurement points. The resulting geographic shape, as shown in FIG. 5, indicates the non-serviceable geographical area based on field measurements.

Figure 8:
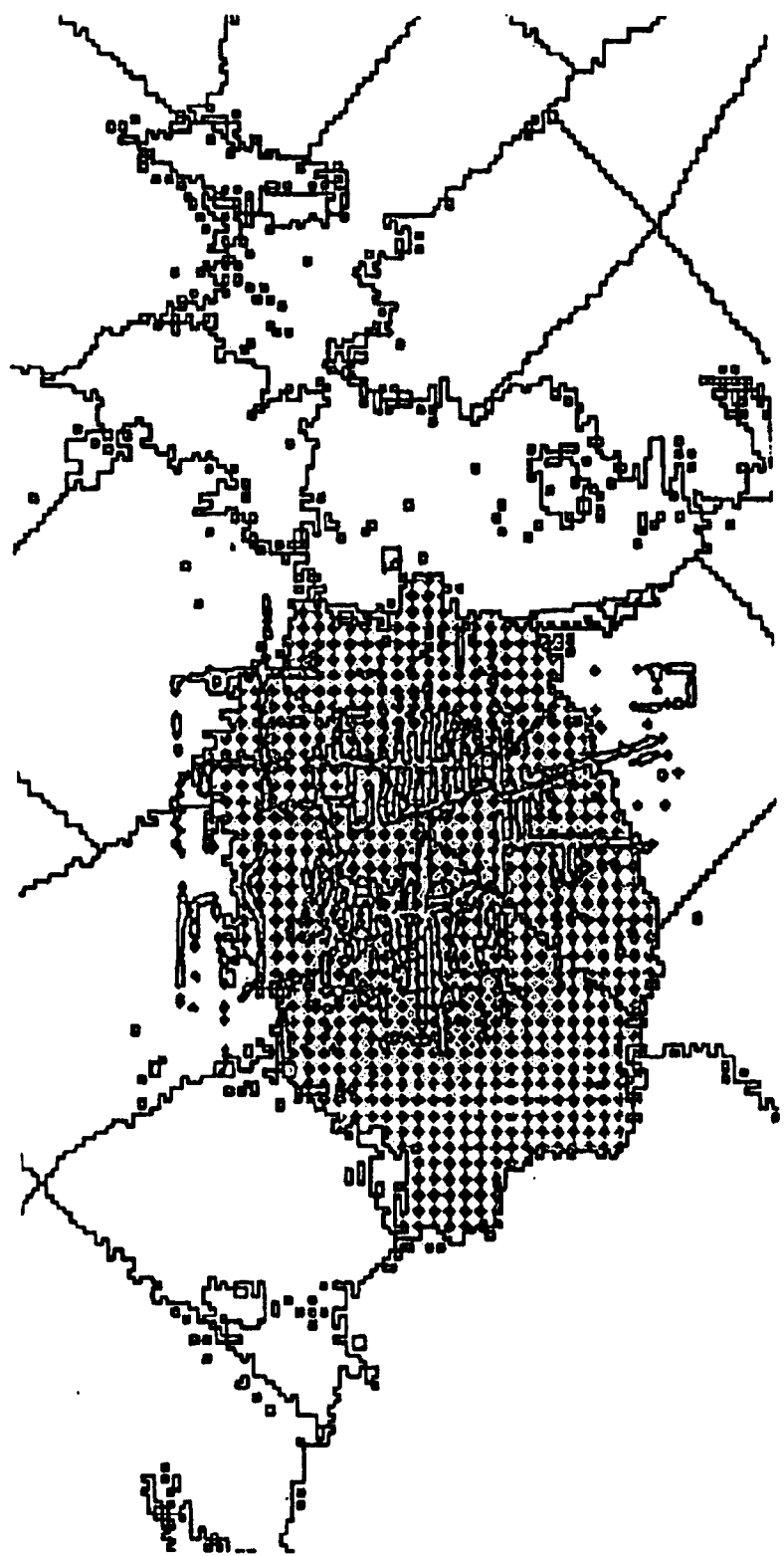
FIG. 8 shows an exemplary map indicating the serviceable geographical area based on field measurements according to an embodiment of the present invention.

Step 207 uses the "field service map" to create a single geographical object encompassing the serviceable data points. Again, either a circle is drawn around each measurement point or a rectangle is drawn around a series of consecutive measurement points. The resulting geographic shape, as shown in FIG. 8, indicates the serviceable geographical area based on field measurements.

Figure 6:
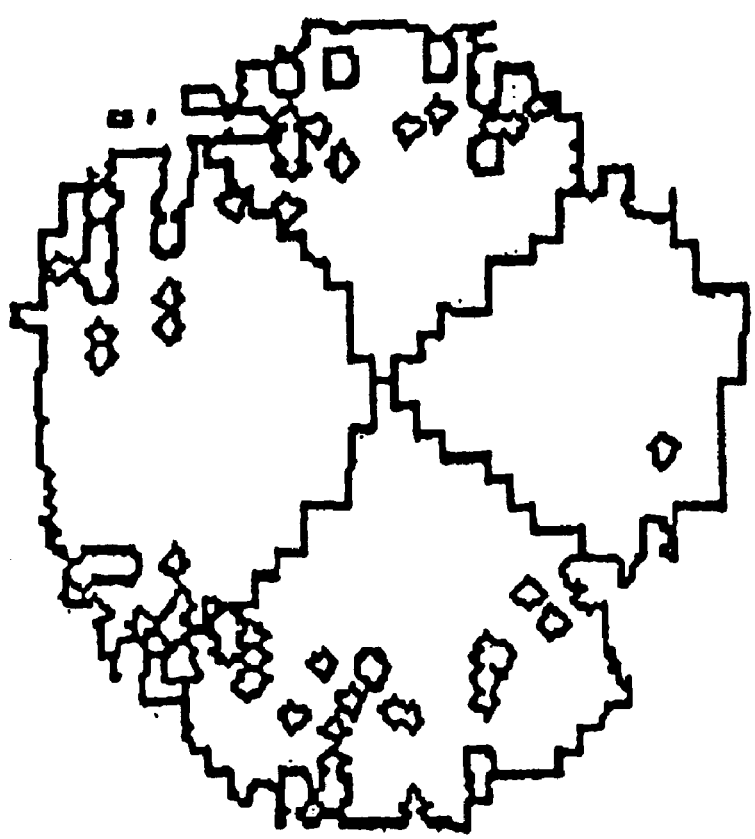
FIG. 6 shows an exemplary "model map minus enhanced" that is generated according to an embodiment of the present invention.

Step 208 includes removing data from the "model map minus" by subtracting the "field non-service map" geographical areas to create an enhanced model map, called a "model map minus enhanced." This is shown in FIG. 6. Any environmental data missing from the mathematical model, such as buildings, land usage types, morphology, freeway sound barriers, billboards, etc., is apparent in the field measurement data. Step 208 increases the accuracy of the prediction of the RF coverage of the fixed wireless system.

Figure 7:
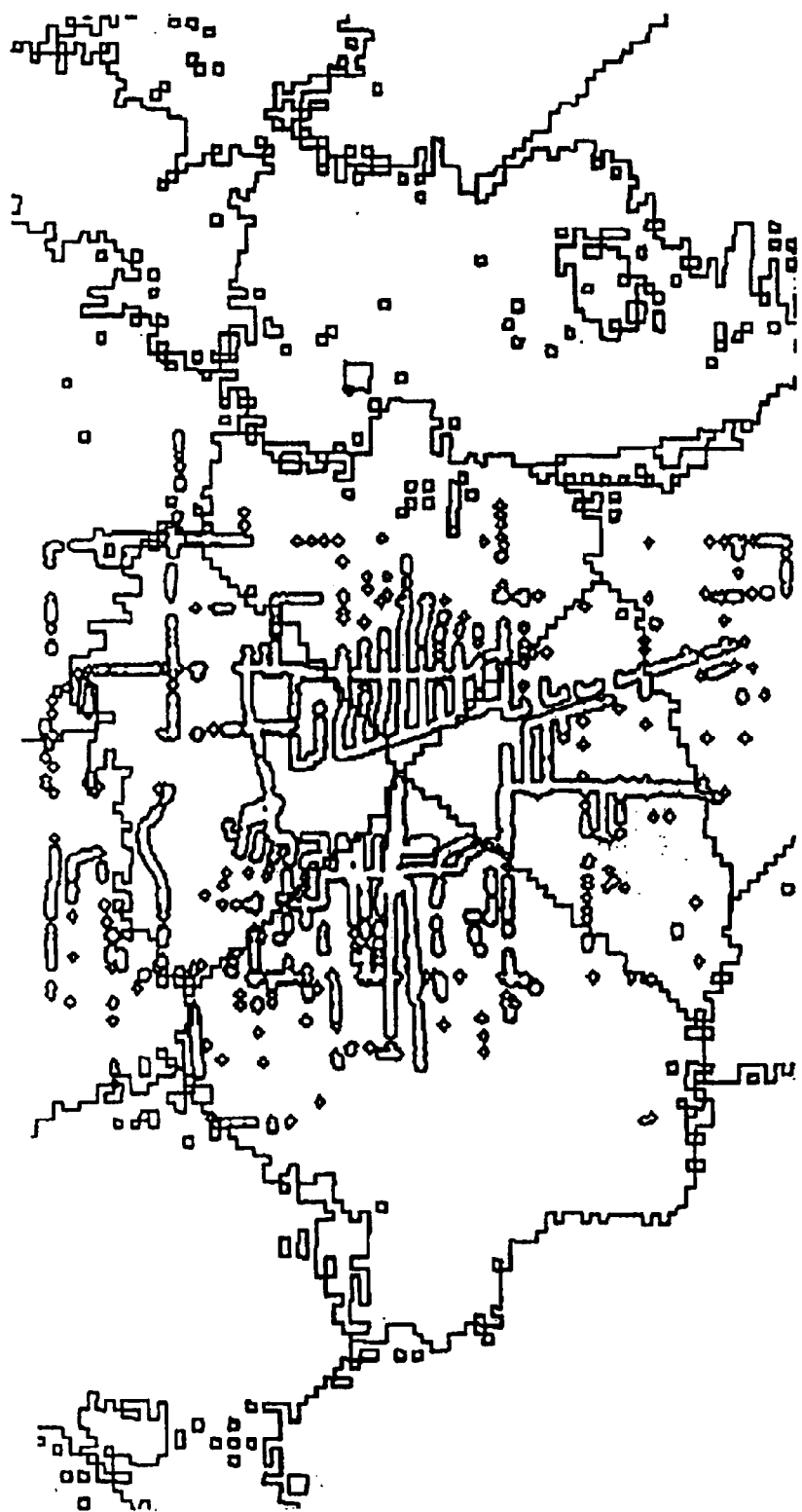
FIG. 7 shows an exemplary "model map plus" that is produced according to an embodiment of the present invention.

A second serviceable building address, called "model map plus," is created using a traditional mathematical model that includes an additional link budget positive margin (step 209). FIG. 7 shows an exemplary "model map plus." The additional link budget positive margin is typically 10 dBm. When the fixed wireless system's standard design level is −102 dBm, the RSSI level for "model map plus" is −112 dBm. This results in a 20 dBm difference from the "model map minus" created at step 202. The "model map plus" is larger than a serviceable map without the additional link budget positive margin, and allows more path loss.

Figure 9:
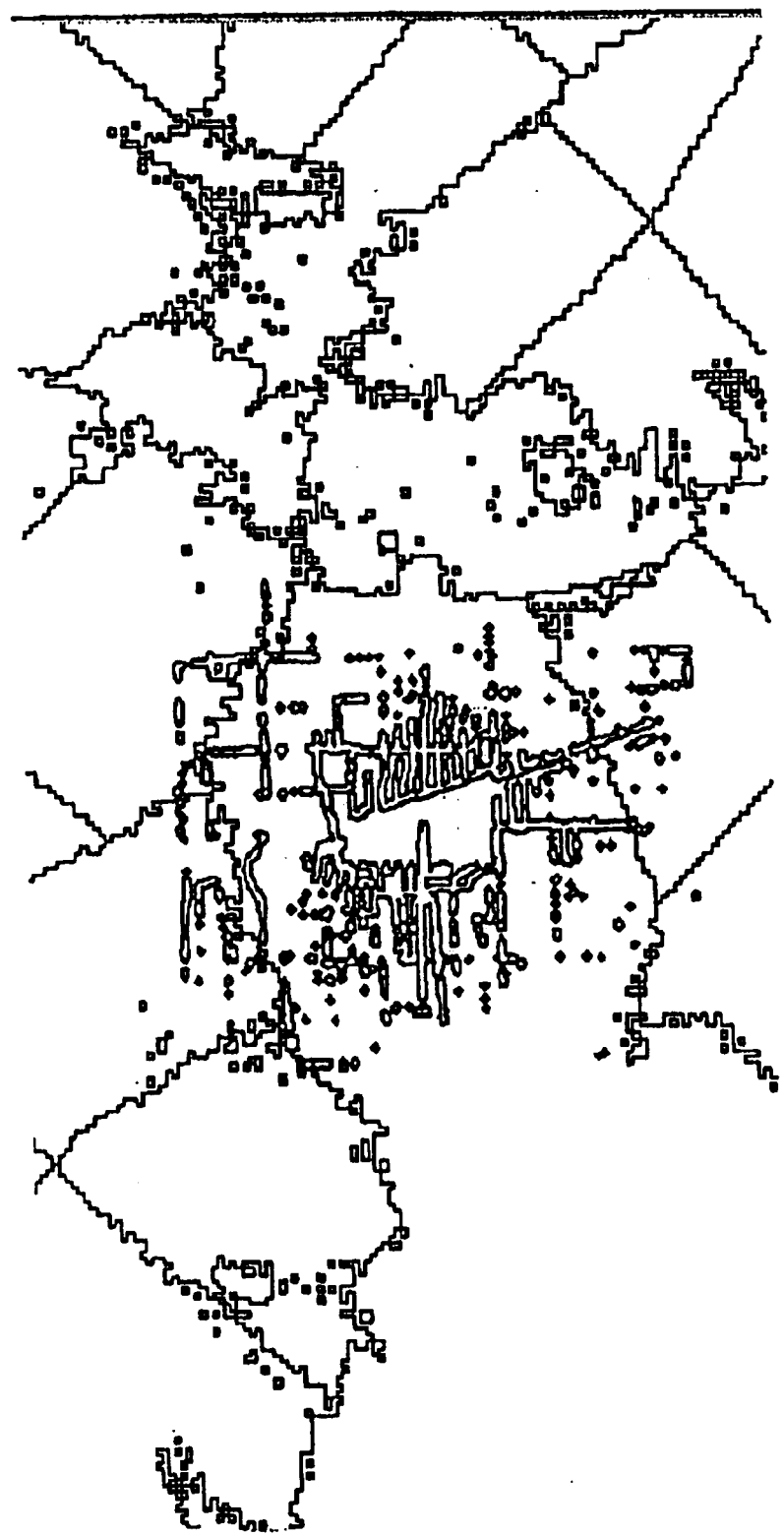
FIG. 9 shows an exemplary "model map plus enhanced" that is produced according to an embodiment of the present invention.

At step 210, the "field service map" is overlaid on the top of the "model map plus," and the intersection thereof creates an enhanced model map, called a "model map plus enhanced," as shown in FIG. 9. The "model map plus enhanced" inherits geographical information from the "field service map," which includes the best servicing fixed wireless base station names and locations in addition to clusters of radios that supply service to that particular geographic area.

Figure 10:
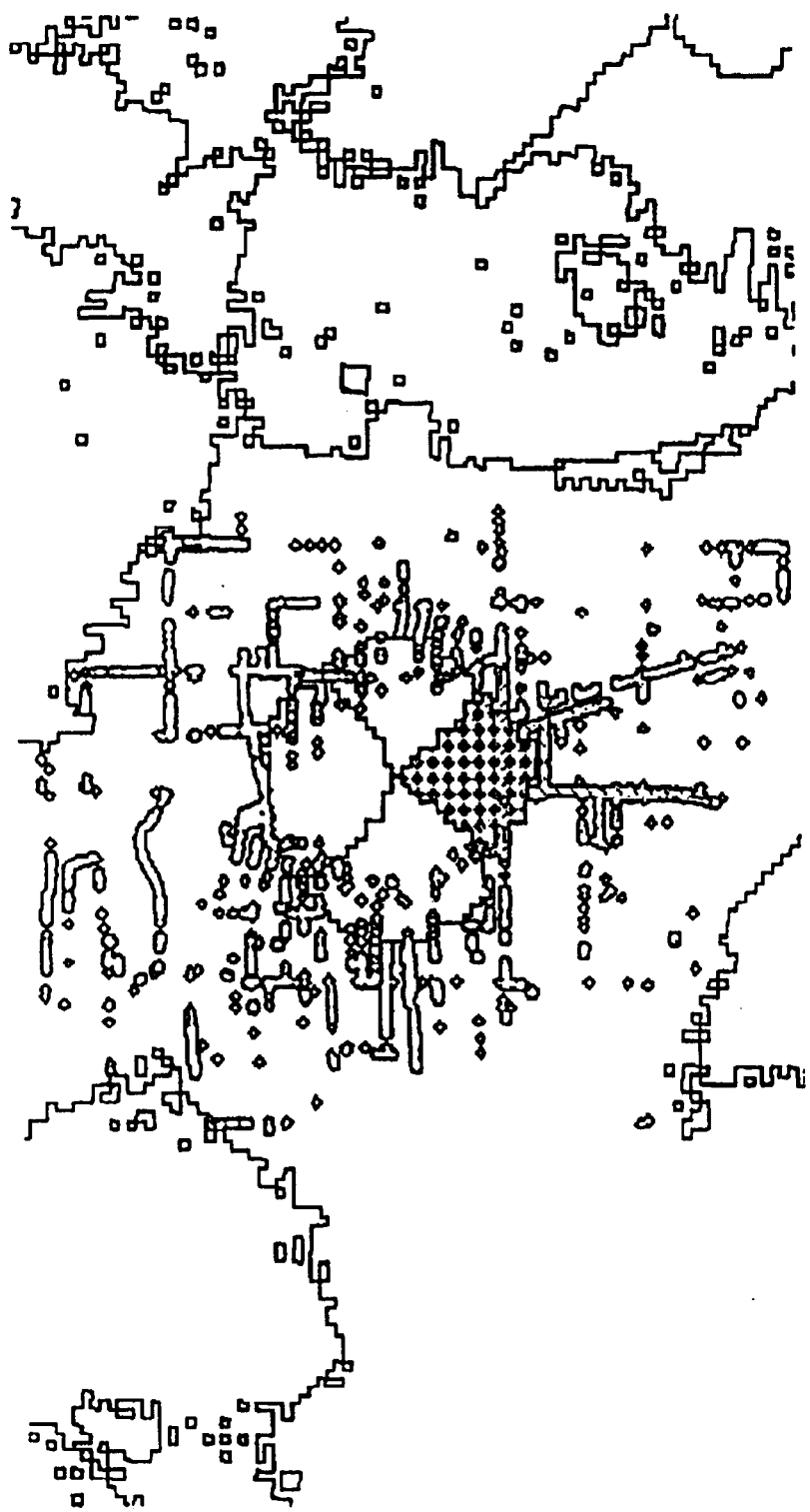
FIG. 10 shows an exemplary RF coverage prediction map that is produced according to an embodiment of the present invention.

Step 211 combines the geographic shapes and data from "model map plus enhanced" with those in "model map minus enhanced" to create an RF coverage prediction map that is shown in the shadowed area of FIG. 10. The method of the present invention resolves the accuracy issue and is capable of predicting more than 90% of serviceable business addresses. The situation of having to confirm service availability exists for any point-to-multipoint fixed wireless systems. The invention may also be implemented with respect to any such point-to-multipoint fixed wireless systems, for example, MMDS, LMDS, etc.

The foregoing description is merely illustrative of the present invention. Various modifications and changes may be made thereto by those skilled in the art that fall within the spirit and scope of the invention, as defined by the appended claims.

What is claimed is:

1. A method of determining radio coverage in an RF broadcast system that includes a plurality of fixed wireless base stations by creating a map depicting a serviceable business address in a coverage area, the method comprising:
   a. using a mathematical model for calculating propagation loss in an urban environment, wherein a link budget reduction margin value is additionally included in the model to create a "model map minus" of the coverage area, and wherein a link budget positive margin value is additionally included in the model to create a "model map plus" of the coverage area;
   b. collecting field measurements relative to fixed wireless base stations in the coverage area, including geographic coordinate records and associated signal strength indicators, to create a plurality of measurement data points;
   c. processing the field measurements to create a "field service map" of a first subset of the plurality of the measurement data points that indicate a serviceable geographic area, and a "field non-service map" of a second subset of the plurality of the measurement data points that indicate a non-serviceable geographic area;
   d. creating a "model map minus enhanced" of the coverage area by removing data from the "model map minus" by subtracting the second subset of the plurality of the measurement data that indicate a "field non-service map";
   e. creating a "model map plus enhanced" of the coverage area by overlaying the "model map plus" with geographic shapes and data based on the first subset of the plurality of the measurement data points that indicate a "field service map"; and
   f. combining the geographic shapes and data from the "model map minus enhanced" with the geographic shapes and data from the "model map plus enhanced" to create the desired map depicting a serviceable business address in a coverage area.

2. The method of claim 1, wherein the RF broadcast system is a point-to-point RF transmission system.

3. The method of claim 1, wherein the RF broadcast system is a point-to-multipoint RF transmission system.

4. The method of claim 1, further compromising using the "field service map" to create a single geographical shape encompassing all of the plurality of measurement data points indicating a serviceable area by drawing either a first shape around each data point or a second shape around a series of consecutive data points, the resulting geographic shape indicating a serviceable geographical area based on the field measurements.

5. The method of claim 1, further compromising using the "field non-service map" to create a single geographical shape encompassing all of the plurality of measurement data points indicating a non-serviceable area by drawing either a first shape around each data point or a second shape around a series of consecutive data points, the resulting geographic shape indicating a non-serviceable geographical area based on the field measurements.

6. A method of determining radio coverage in a point-to-multi-point radio transmission system that includes a plurality of fixed wireless base stations by creating a map depicting a serviceable business area in a coverage area, the method comprising:
   a. using a mathematical model for calculating propagation loss in an urban environment, wherein a link budget reduction margin value is additionally included in the model to create a "model map minus" of the coverage area, and wherein a link budget positive margin value is additionally included in the model to create a "model map plus" of the coverage area;
   b. collecting field measurements relative to fixed wireless base stations in the coverage area, including geographic coordinate records and associated signal strength indicators, to create a plurality of measurement data points;
   c. processing the field measurements using a subset of the plurality of the measurement data points that indicate suitable service to create a "field service map";
   d. processing the field measurements using a subset of the plurality of measurement data points that do not indicate suitable service to create a "field non-service map";
   e. using the "field service map" to create a single geographical shape encompassing all of the plurality of measurement data points indicating a serviceable area by drawing either a first shape around each data point or a second shape around a series of consecutive data points, the resulting geographic shape indicating a serviceable geographical area based on the field measurements;
   f. using the "field non-service map" to create a single geographical shape encompassing all of the plurality of measurement data points indicating a non-serviceable area by drawing either a first shape around each data point or a second shape around a series of consecutive data points, the resulting geographic shape indicating a non-serviceable geographical area based on the field measurements;
   g. removing data from the "model map minus" by subtracting the geographical area of the "field non-service map" to create a "model map minus enhanced";
   h. overlaying the "field service map" on top of the "model map plus" such that the field service map inherits geographical information from the "model map plus enhanced"; and
   i. combining the geographic shapes and data fields from the "model map plus enhanced" with the "model map minus enhanced" by associating the fixed wireless base stations between both sources to complete the map depicting a serviceable business address in a coverage area.

7. The method of claim 6, wherein the field measurements collected in step (b) include measurements of signal strength received from each wireless base station.

8. The method of claim 6, wherein the field measurements collected in step (b) include measurements of received signal strength of test signals transmitted from equipment associated with a test vehicle at various frequencies and received at each wireless base station.

9. The method of claim 6, wherein the field measurements collected in step (b) include measurements collected in the street where a particular business address is located and measurements collected at a building located at the business address.

10. The method of claim 6, wherein in step (e) the "field service map" takes into account the difference between field measurements collected in the street where a particular business address is located versus field measurements collected at the building located at the business address.

11. The method of claim 6, wherein in step (b) a mobile test unit including a test receiver is used for collecting the field measurements.

12. The method of claim 6, wherein a portable device is used for collecting field measurements at the building located at the business address.

13. The method of claim 6, wherein the information of step (h) includes the best serving fixed wireless base station names and locations in addition to clusters of radios that supply service to that particular geographic area.

14. The method of claim 9, wherein in step (b) the field measurements collected in the street where a particular business address is located are collected approximately every twenty meters.

* * * * *